May 8, 1928.

F. T. ROBERTS 1,668,782

METHOD OF MAKING RUBBER BLADDERS

Filed Sept. 20, 1924

2 Sheets-Sheet 1

Inventor
Fred Thomas Roberts,
By Baker, Macklin, Goebuck & Tean
Attorneys.

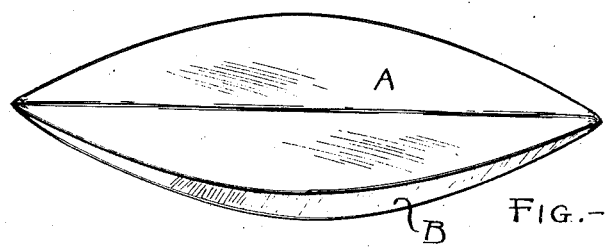
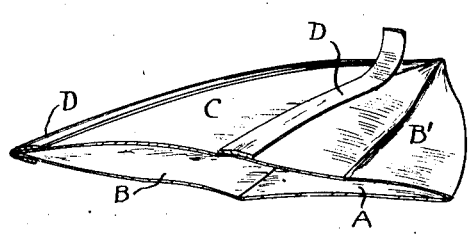
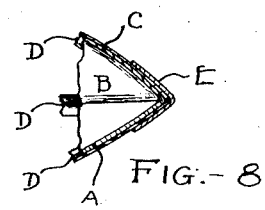
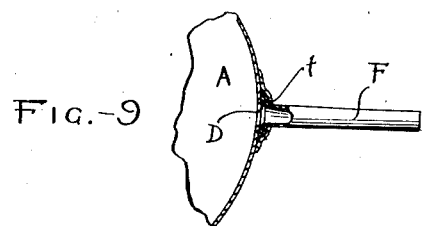
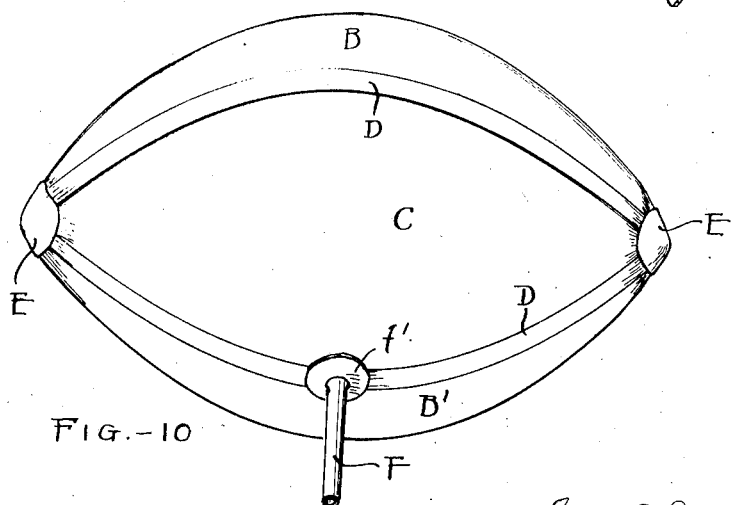

Patented May 8, 1928.

1,668,782

UNITED STATES PATENT OFFICE.

FRED THOMAS ROBERTS, OF YONKERS, NEW YORK, ASSIGNOR TO PARAMOUNT RUBBER CONSOLIDATED, INC., OF TUCKAHOE, NEW YORK, A CORPORATION OF DELAWARE.

METHOD OF MAKING RUBBER BLADDERS.

Application filed September 20, 1924. Serial No. 738,828.

Rubber bladders for foot balls and similar articles are customarily made from four lenticular sheets of rubber joined together by hand at their edges and reinforced with strips applied along the seams and patches at the points of the ellipsoid thus produced. The object of this invention is to enable more expeditious and economical manufacture of such bladders, as well as the production of a stronger and more uniform article, by making the seams by machinery.

In accomplishing the above result, I first form a pile of rubber sheets in which there is an upper sheet and a lower sheet extending for the full width of one of the lenticular sections and between these sheets, I insert two doubled sheets from opposite sides with their folds adjacent, and with their leaves held apart by separators, and then I cut through this pile with a lenticular outline die which not only cuts out the sheets, but by pressure of the narrow beveled face of the die joins the upper sheet to each of the upper leaves of the doubled sheets and the lower sheet to each of the lower leaves of the doubled sheets.

Thus, by this simple operation, I form the body for the ellipsoidal bladder. The projecting edge of the die cuts through the rubber to cut out the biscuit while the narrow beveled face presses the sheets together to effect the seam. I employ raw sheet rubber, which however, is treated so that the sheets do not adhere except when subjected to considerable pressure, and thus I am enabled to allow the sheets to lie directly on top of each other without danger of adherence and at the same time form the seams wherever desired, there being such pressure as causes adherence. After the formation of the biscuit, I apply the reinforcing strips and end patches and the filling tube in the usual manner and vulcanize the article.

My invention is hereinafter more fully explained in connection with the drawings, and its essential characteristics are summarized in the claims.

Figure 1:
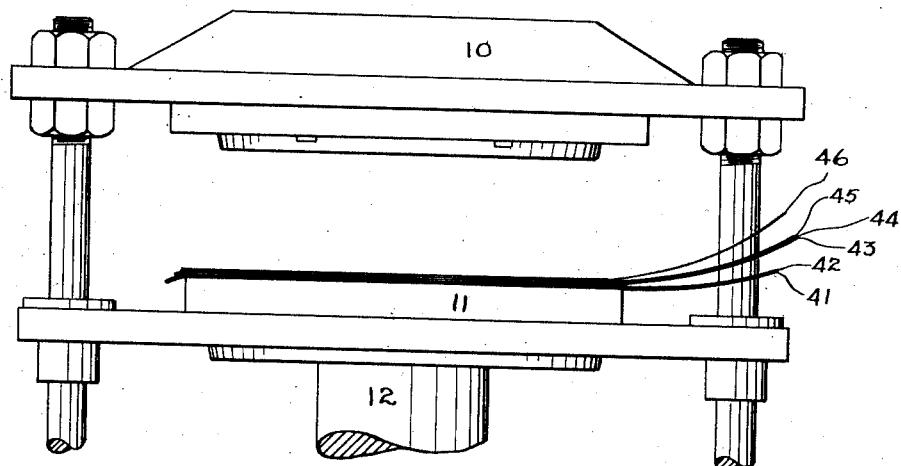
Figure 2:
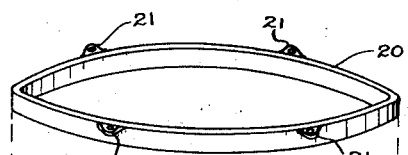
Figure 3:
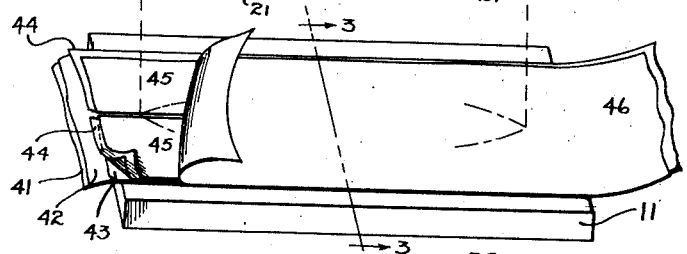
Figure 4:
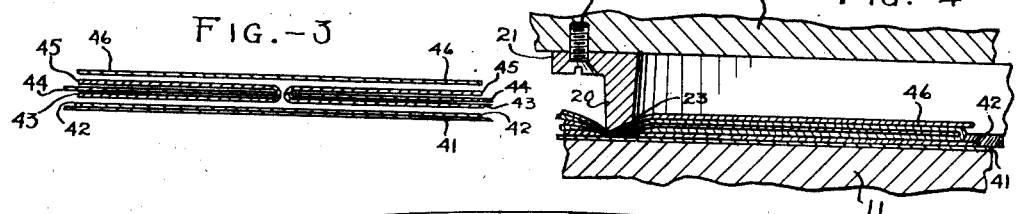
Figure 5:
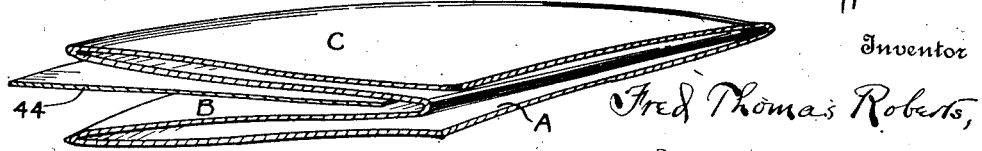

In the drawings Fig. 1 is an elevation of the upper portion of a forming press for dieing out the bladders; Fig. 2 is a perspective of the die, the lower platen and the surmounted sheets of rubber; Fig. 3 is a cross section of the pile of rubber sheets, as indicated by the line 3—3 of Fig. 2; Fig. 4 is a section through the die and adjacent portion of the two platens; Fig. 5 is a perspective of a portion of the bladder as formed by the die and before the separator has been withdrawn; Fig. 6 is a perspective of the bladder as formed uninflated; Fig. 7 is a perspective of a portion of the bladder with some of the reinforcing strips applied; Fig. 8 is a cross section of a portion of the bladder at one of the points; Fig. 9 is a cross section of the bladder at the filling tube; Fig. 10 is a perspective of the completed article inflated.

Referring first to Figs. 1 to 4 inclusive, 10 indicates the upper or stationary platen of a forming press; and 11 the lower platen adapted to be raised by a suitable hydraulic ram 12. The die 20 is shown as a strap of metal bent into a lenticular form corresponding in shape to each of the four sheets from which the rubber body is to be made. This strap has suitable means by which it is secured to the upper platen, as for instance the outwardly projecting ears 21 through which screws 22 may pass into the platen.

The active face 23 of the die is beveled inwardly, as illustrated particularly in Fig. 4. This face is comparatively narrow and, for reasons of strength, the die may be flared or thickened from this face toward the back as shown in Fig. 4.

In operation, assuming that the die 20 has been secured to the upper platen, I first place across the lower platen a strip of paper 41, surmounted by a rubber strip 42. Above the rubber strip 42, I place two doubled strips of rubber with their folds adjacent and with their two leaves separated by paper separators. Thus, I have above the rubber strip 42 first the lower leaves 43 of the two doubled sheets, then the two paper separators 44, then the upper leaves 45 of the two doubled sheets. Finally, above the upper leaves of the two doubled sheets, I place a strip of rubber 46 of the same width as the bottom strip. The rubber is preferably raw rubber which has been treated with a light coating of soapstone or starch or similar material, so that it will only adhere when subjected to considerable pressure.

When the sheets have been surmounted as described, pressure is admitted to the hydraulic cylinder, raising the ram 12, thus elevating the lower platen with the sheets into coaction with the suspended die 20. After this die comes into contact with the rubber, high pressure fluid is admitted to the cylinder, causing the platen to be further elevated sufficiently so that the outer edge of the die cuts through the various sheets and at the same time the beveled face thereof presses one sheet of rubber into the material of the adjacent sheet of rubber. The result is that the upper sheet is joined to the upper leaves of the two doubled sheets and the lower leaves of the doubled sheets are joined to the lower sheet. The paper separators 44, though they are cut by the die, operate to prevent a seam between the leaves 42 and 44 of the doubled sheets.

Approximately speaking, the inner or higher edge of the beveled face is preferably located above the narrower edge by an amount corresponding to one-half the combined thickness of the rubber to be cut out by the die edge, so that each adjacent pair of sheets at the seam is caused to occupy approximately the thickness of the single sheet, each sheet of rubber being thus intimately forced into the other sheet, making a homogeneous seam, which after vulcanization is as strong as the unseamed portion of the article.

After the die operation described, the lower platen is dropped, and the joined and cut out biscuit comprising the lenticular flat sheets A and C and the lenticular doubled sheets B and B¹, is removed. The separators are then removed from between the two layers of the doubled sheets. Then four reinforcing strips of raw rubber D are placed over the four seams formed, and then discs of raw rubber E are placed on the two points of the article overlapping the ends of the four reinforcing strips D.

The filling tube F is applied to the body in any suitable manner. A satisfactory method is to form this tube with a head $f$ as shown in Fig. 9 and cover the head with a washer $f^1$ which surrounds the tube, the head and washer being secured to the outside of the bladder preferably across one of the reinforcing strips D.

It is to be understood after the formation of the article, either before or after the filling tube is applied, the body is vulcanized in any suitable manner, either by vapor cure, acid cure, separation by soapstone and the application of heat or in an external mould with internal pressure in the article, as may be desired. The tube may be applied before the vulcanization and the whole article vulcanized as a unit or this tube may be cemented in place after vulcanization.

I find that ordinary wrapping paper serves well as a padding 41 below the pile of sheets to enable the edge of the die to cut entirely through the bottom-most sheet. Wrapping paper also serves well as the intermediate separators 44. The actual pressure employed may be varied greatly, but I believe the best results are produced by using a pressure of many thousand pounds per square inch of the beveled face of the die.

By mounting the various strips of rubber and separators on rolls (not shown) they may be conveniently fed into the press as shown in Fig. 1 in proper relation to each other. Following each operation of the die, the formed biscuit is removed and the pile of rubbers, sheets and separators drawn along a distance greater than the length of the biscuit to provide a new pile ready for the next operation. The body of the biscuit may be thus formed with great rapidity, leaving only the hand operations of applying the strips, patches and filling tube.

Reference is made to my co-pending application No. 712,505 filed May 12th, 1924, for dominating claims on the method of simultaneously forming a plurality of surmounting seams between different sheets of rubber.

Having thus described my invention, I claim:

1. The method of making hollow articles of sheet material, comprising superimposing a pair of sheets with a plurality of intermediate doubled sheets and simultaneously joining each single sheet with the adjacent leaves of said doubled sheets.

2. The method of making hollow articles of plastic material, comprising simultaneously forming by pressure seams between two sheets and the adjacent leaves of two doubled intermediate sheets.

3. The method of making hollow articles of plastic material, comprising surmounting a sheet of such material, two doubled sheets with their folds adjacent and another sheet overlapping the two doubled sheets, and then by pressure in an outline region joining each outer sheet to the adjacent leaves of the two doubled sheets.

4. The method of making hollow rubber articles, comprising placing between two sheets of rubber, a pair of outwardly opening doubled sheets with their folded edges adjacent and thereafter cutting through the pile of sheets with an outline die having a beveled face, said outline extending over the region of both doubled sheets.

5. The method of making hollow articles of plastic material, comprising placing two doubled sheets with their folds adjacent between two outer overlapping sheets, and then by pressure in an outline region joining each outer sheet to the adjacent leaves of the two doubled sheets while preventing junction between the two leaves of a double sheet.

6. The method of making hollow rubber articles, comprising placing between two sheets of rubber, a pair of outwardly opening doubled sheets with their folded edges adjacent and thereafter cutting through the pile of sheets with an outline die having a narrow face, while preventing junction between the leaves of the doubled sheets.

7. The method of making hollow articles of sheet material, comprising superimposing a pair of sheets with a plurality of intermediate doubled sheets having separating means between their leaves, and simultaneously joining each single sheet with the adjacent leaves of said doubled sheets.

8. The method of making hollow articles of plastic material, comprising simultaneously forming by pressure seams between two sheets and the adjacent leaves of two doubled intermediate sheets having separating sheets between their leaves, removing the separating sheets and vulcanizing the article.

9. The method of making foot ball bladders and similar articles comprising placing two doubled sheets with their folds adjacent between two outer sheets, pressing such superimposed sheets with an edge forming a circuit to cut out and join a biscuit, and thereafter vulcanizing the biscuit.

10. The method of making foot ball bladders and similar articles comprising placing two doubled sheets with their folds adjacent between two outer sheets, cutting through superimposed sheets to make four lenticular sheets with abutting edges, joining such edges, placing reinforcing strips over the seams thus formed and vulcanizing the article.

11. The method of making foot ball bladders and similar articles comprising interposing between two sheets of rubber, a pair of doubled sheets with their folds substantially abutting and then pressing such pile of sheets with a lenticular die, the points of which are located in a line approximately coincident with the folded lines of the doubled sheets.

12. The method of making foot ball bladders and similar articles comprising placing two double sheets of rubber with their folds substantially abutting between two outer sheets, cutting out a biscuit from such surmounted sheets by a lenticular die which joins the outer sheet to the adjacent leaf of the doubled sheets, at the same time preventing the mutual adherence of the leaves of the doubled sheets, and thereafter vulcanizing the article.

13. The method of making foot ball bladders and similar articles comprising placing a pair of doubled sheets of rubber between two outer sheets, there being separators between the doubled sheets, simultaneously cutting through both the outer sheets and the doubled sheets by a die having an edge forming a circuit and adapted to form seams by pressure between each outer sheet and the adjacent leaf of the doubled sheets, thereafter placing reinforcing strips over the seam thus formed and vulcanizing the article.

14. The method of making foot ball bladders and similar articles comprising placing between two sheets of rubber, a pair of doubled sheets with their folds substantially abutting and with separators between the folds, then pressing such pile of sheets with a lenticular die, the longitudinal axis of which registers with the line of abutment, said die having a narrow edge beveled inwardly away from the sheets whereby the outward edge of the die cuts through the sheets while the bevel forms seams, and thereafter removing the separators from between the doubled sheets and vulcanizing the formed biscuit.

In testimony whereof, I hereunto affix my signature.

FRED THOMAS ROBERTS.